(No Model.)
E. HOXIE.
STATIONARY FIRE ENGINE.
No. 466,269. Patented Dec. 29, 1891.
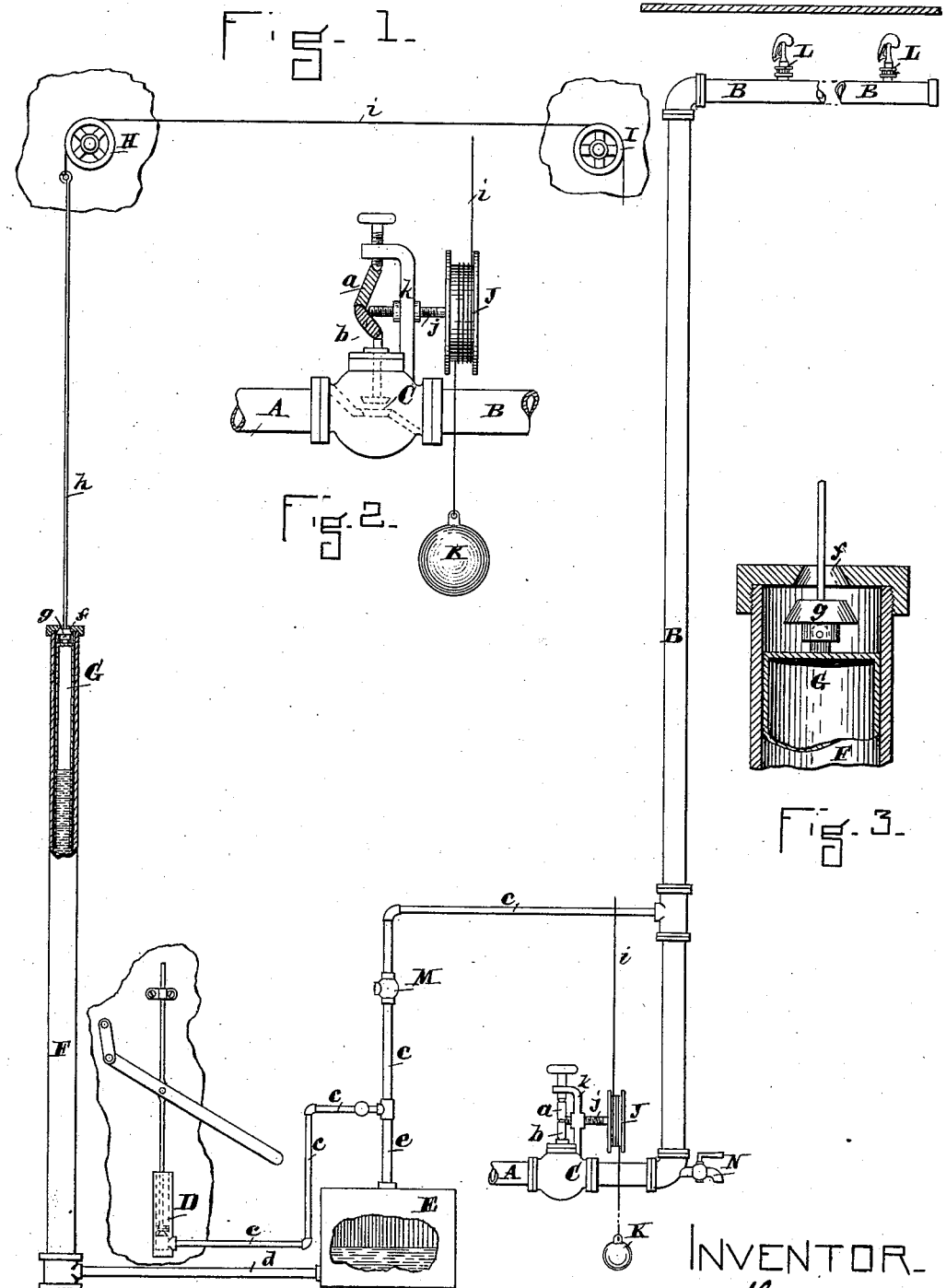
WITNESSES
H. B. Emery
G. L. Cabot
INVENTOR
Edmund Hoxie
per Edw. Dummer, Atty.

United States Patent Office.

EDMUND HOXIE, OF EVERETT, MASSACHUSETTS.

STATIONARY FIRE-ENGINE.

SPECIFICATION forming part of Letters Patent No. 466,269, dated December 29, 1891.

Application filed January 16, 1891. Serial No. 378,053. (No model.)

*To all whom it may concern:*

Be it known that I, EDMUND HOXIE, a citizen of the United States, residing at Everett, in the county of Middlesex and State of Massachusetts, have invented a new and useful Improvement in Automatic Fire-Extinguishing Apparatus, of which the following is a specification, reference being had to the accompanying drawings.

The main object of my invention is to provide means whereby, in what is known as the "dry" or "air" system in automatic fire-extinguishing apparatus, the air may be compressed to any desired extent in the water-distributing pipes, so that the water-excluding valve will not be likely to prematurely open on account of the escape of air by leakage.

The invention consists in the devices and combinations of devices hereinafter set forth, and specifically pointed out in the claims.

In the drawings, Figure 1 shows so much of an external view and section of an automatic fire-extinguishing apparatus embodying my invention as is sufficient for illustration of the same. Fig. 2 shows on a larger scale the device for releasing the water-excluding valve. Fig. 3, also drawn on a larger scale, shows a section of part of the tank and a view of part of the float therein and of the valve connected therewith.

At A is shown a part of the water-supply pipe. The distributing branches B (as many and located as desired) are connected with the pipe A by means of a valve at C. This valve is held to its seat by means of an adjusting-screw and a knee-joint formed of the members $a$ and $b$. The distributing-pipes are connected with an air-pump D by means of pipes $c$.

There is a reservoir E connected with a tank F by means of pipe $d$. From the upper part of this reservoir a pipe $e$ connects with the pipes $c$, and hence leads to the air-pump and to the distributing-pipes. The reservoir E is closed with the exception of the openings into the pipes $d$ and $e$. The tank F has an opening at the top, at which there is a valve-seat $f$. In this tank there is a float G, supporting at the upper end a valve $g$, suitable to fit the seat $f$ and close the opening thereat in the tank. To the float is connected a rod $h$, and to this rod a rope or chain $i$. The latter extends around pulleys H and I (as many as are necessary and located wherever desired) and extends several times around a pulley J, having at the lower end a weight K. A screw $j$ is fixed to the pulley J to rotate therewith. This screw moves in a stand $k$ and is located so as to press against the knee-joint $a\,b$ to break the same down when screwed inward.

Sprinklers L, the valves of which will be released by the action of heat, are located wherever desired on the distributing-pipes. The valves of these sprinklers and the water-excluding valve C being closed, there being no water in the distributing-pipes B, air is forced into the reservoir E by means of the air-pump, and also into the distributing-pipes. There is a certain necessary quantity of water or other liquid in the reservoir and the tank F. Forcing air into the reservoir above the liquid therein causes the latter to flow into the tank, and hence causes the float G to rise until the valve $g$ presses against the seat $f$. By continued operation of the pump the air in pipes B and reservoir is compressed to any extent desired. When any one of the valves of the sprinklers is opened, as in the case of fire, air will flow out of the pipes and reservoir, allowing the water and float in the tank to fall, the weight of the float itself being heavier than the weight K. Thus the pulley J will be caused to revolve by means of the rope $i$ in the right direction to cause the screw $j$ to move against the knee-joint $a\,b$. This joint being broken down, as illustrated in Fig. 2, water in the supply-pipe being under pressure will lift the valve C and flow into the distributing-pipes and out at the sprinkler to perform the required service. A check-valve of ordinary construction at M, though allowing air to pass freely from the air-pump to the distributing-pipes, will prevent water from flowing from these pipes to the pump or the reservoir.

To restore the apparatus to its standing condition ready for action, the valve C is forced to its seat to be held there by the knee-joint in position, as in Fig. 1. Then the water is drawn from the distributing-pipes, as by means of a faucet N. The sprinkler-valve is then sealed to its seat, the faucet at N closed, and the pump operated until the air in reservoir and distributing-pipes is at the pressure required. By having this air at considerable pressure, which may be obtained, since the tank will be closed by means of the valve $f$, an allowance may be made for a certain amount of leakage of air from the pipes, so that such action will not be likely to take place (the falling of the float and opening of the water-excluding valve) as to fill the distributing-pipes with water until the leakage be discovered.

I claim as my invention—

1. In a fire-extinguishing apparatus, the combination of a water-supply pipe, distributing-pipes connected with said supply-pipe by means of a valve and provided with automatic sprinklers, a tank, a valve for closing the opening from the tank to the external air, a float and weight in said tank having fixed thereto said valve for the tank, devices for releasing the water-supply valve operated by said float and weight, and a reservoir closed with the exception of an opening at the lower part or for water to said tank and an opening at the upper part or for air leading to an air-pump and the distributing-pipes, substantially as specified.

2. In a fire-extinguishing apparatus, the combination of a water-supply pipe and valve therefor, and a tank and means for forcing water thereinto, a float (being also a weight) in said tank having a valve fixed thereto for closing an opening from the tank to the outer air, and a flexible connection extending through said opening and over suitable pulleys or guides connecting said float and weight with a smaller weight, said connection being also attached to for operating a releasing device for said valve of the water-supply pipe, substantially as specified.

3. The combination of a supply-pipe, a valve which will be pressed in a direction outward from its seat by the contents of said pipe, a knee-joint by which the valve is held to its seat, and a screw having thereon a pulley for a rope, whereby the screw is caused to move against said joint to operate the same and release the valve, substantially as specified.

EDMUND HOXIE.

Witnesses:
CHAS. F. FLETT,
G. ABBOTT GILMAN,